United States Patent
Kikawada et al.

(10) Patent No.: US 10,630,392 B2
(45) Date of Patent: Apr. 21, 2020

(54) QUANTUM COMMUNICATION SYSTEM, TRANSMITTING APPARATUS, AND RECEIVING APPARATUS

(71) Applicants: KABUSHIKI KAISHA TOSHIBA, Minato-ku (JP); Toshiba Infrastructure Systems & Solutions Corporation, Kawasaki-shi (JP)

(72) Inventors: Masakazu Kikawada, Yokohama (JP); Masatoshi Hirono, Yokohama (JP)

(73) Assignees: KABUSHIKI KAISHA TOSHIBA, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

(21) Appl. No.: 16/354,309

(22) Filed: Mar. 15, 2019

(65) Prior Publication Data
US 2020/0067601 A1    Feb. 27, 2020

(30) Foreign Application Priority Data
Aug. 22, 2018    (JP) .................................. 2018-155481

(51) Int. Cl.
*H04B 10/524* (2013.01)
*H04B 10/532* (2013.01)
*H04B 10/70* (2013.01)

(52) U.S. Cl.
CPC ......... *H04B 10/524* (2013.01); *H04B 10/532* (2013.01); *H04B 10/70* (2013.01)

(58) Field of Classification Search
CPC ..... H04B 10/524; H04B 10/532; H04B 10/70
See application file for complete search history.

(56) References Cited

U.S. PATENT DOCUMENTS

| 5,394,489 A | * | 2/1995 | Koch | ................. | G02B 6/12004 |
| | | | | | 257/E27.128 |
| 2003/0095736 A1 | * | 5/2003 | Kish, Jr. | ................ | B82Y 20/00 |
| | | | | | 385/14 |

FOREIGN PATENT DOCUMENTS

JP    5413687    2/2014

* cited by examiner

*Primary Examiner* — Leslie C Pascal
(74) *Attorney, Agent, or Firm* — Oblon, McClelland, Maier & Neustadt, L.L.P.

(57) ABSTRACT

According to one embodiment, a quantum communication system includes a transmitting apparatus and a receiving apparatus. The transmitting apparatus includes a plurality of light sources configured to generate a plurality of optical pulses having different wavelengths, an encoder including a single first modulator configured to modulate the optical pulses to encode information, and a transmitting part configured to transmit an optical pulse train including the modulated optical pulses to the receiving apparatus. The receiving apparatus includes a receiving part configured to receive the optical pulse train from the transmitting apparatus, and a decoder configured to obtain information based on the received optical pulse train.

8 Claims, 4 Drawing Sheets

QUANTUM COMMUNICATION SYSTEM, TRANSMITTING APPARATUS, AND RECEIVING APPARATUS

CROSS-REFERENCE TO RELATED APPLICATIONS

This application is based upon and claims the benefit of priority from Japanese Patent Application No. 2018-155481, filed Aug. 22, 2018, the entire contents of which are incorporated herein by reference.

FIELD

Embodiments described herein relate generally to quantum communication systems.

BACKGROUND

A quantum key distribution system includes a transmitter, a receiver, and a quantum transmission path that connects the transmitter and the receiver. The transmitter transmits photons to the receiver via the quantum transmission path. Thereafter, the transmitter and the receiver mutually confirm signal information to share an encryption key. This technique is generally called quantum key distribution (QKD). According to the basic principles of quantum mechanics, the physical states of photons change when the photons are tapped by an eavesdropper on the quantum transmission path. This causes an error between the signal transmitted by the transmitter and the signal received by the receiver. QKD enables detection of the presence of an eavesdropper on the quantum transmission path by comparing common parts of the signals.

For QKD to work, it is desirable that the states of photons do not change throughout the quantum transmission path. However, photons change in both polarization and phase due to, e.g., a temperature change or vibration of the quantum transmission path. The quantum key distribution system includes a feedback mechanism that compensates for such a polarization disturbance and phase disturbance.

In addition, the QKD system may utilize wavelength multiplexing to improve the key generation rate (see, for example, Japanese Patent No. 5413687).

In a quantum communication system, such as a QKD system, utilizing phase modulation, modulators are important, but costly. In the optical communication system disclosed in Japanese Patent No. 5413687, a modulator is provided for each wavelength. Therefore, as the number of wavelengths increases, the number of modulators increases. As a result, the apparatus (transmitter and/or receiver) becomes complex and more costly.

DETAILED DESCRIPTION

According to one embodiment, a quantum communication system includes a transmitting apparatus and a receiving apparatus. The transmitting apparatus includes a plurality of light sources configured to generate a plurality of optical pulses having different wavelengths, an encoder including a single first modulator configured to modulate the optical pulses to encode information, and a transmitting part configured to transmit an optical pulse train including the modulated optical pulses to the receiving apparatus. The receiving apparatus includes a receiving part configured to receive the optical pulse train from the transmitting apparatus, and a decoder configured to obtain information based on the received optical pulse train.

Hereinafter, embodiments will be described with reference to the accompanying drawings.

First Embodiment

Figure 1:
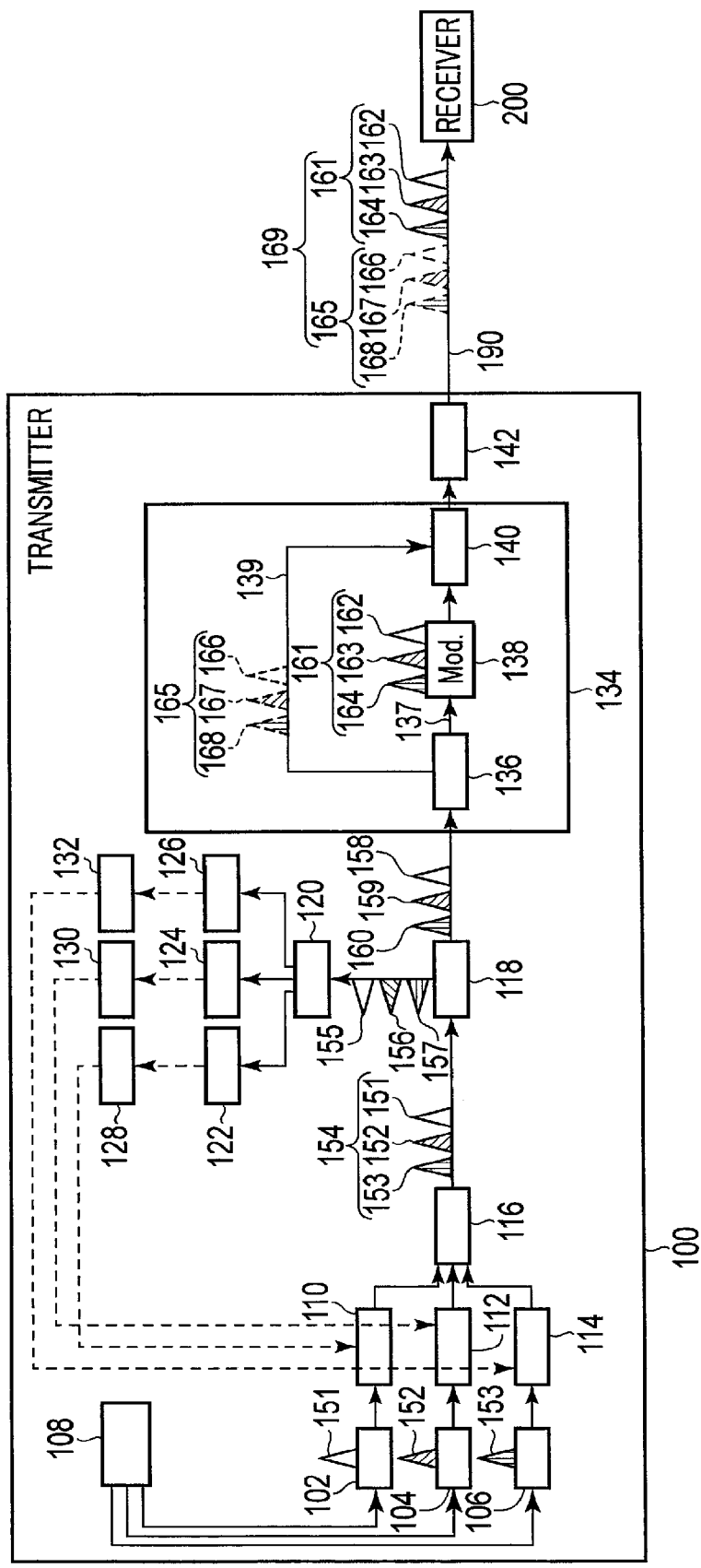
FIG. 1 is a diagram showing a transmitter for a quantum key distribution system according to a first embodiment.
Figure 2:
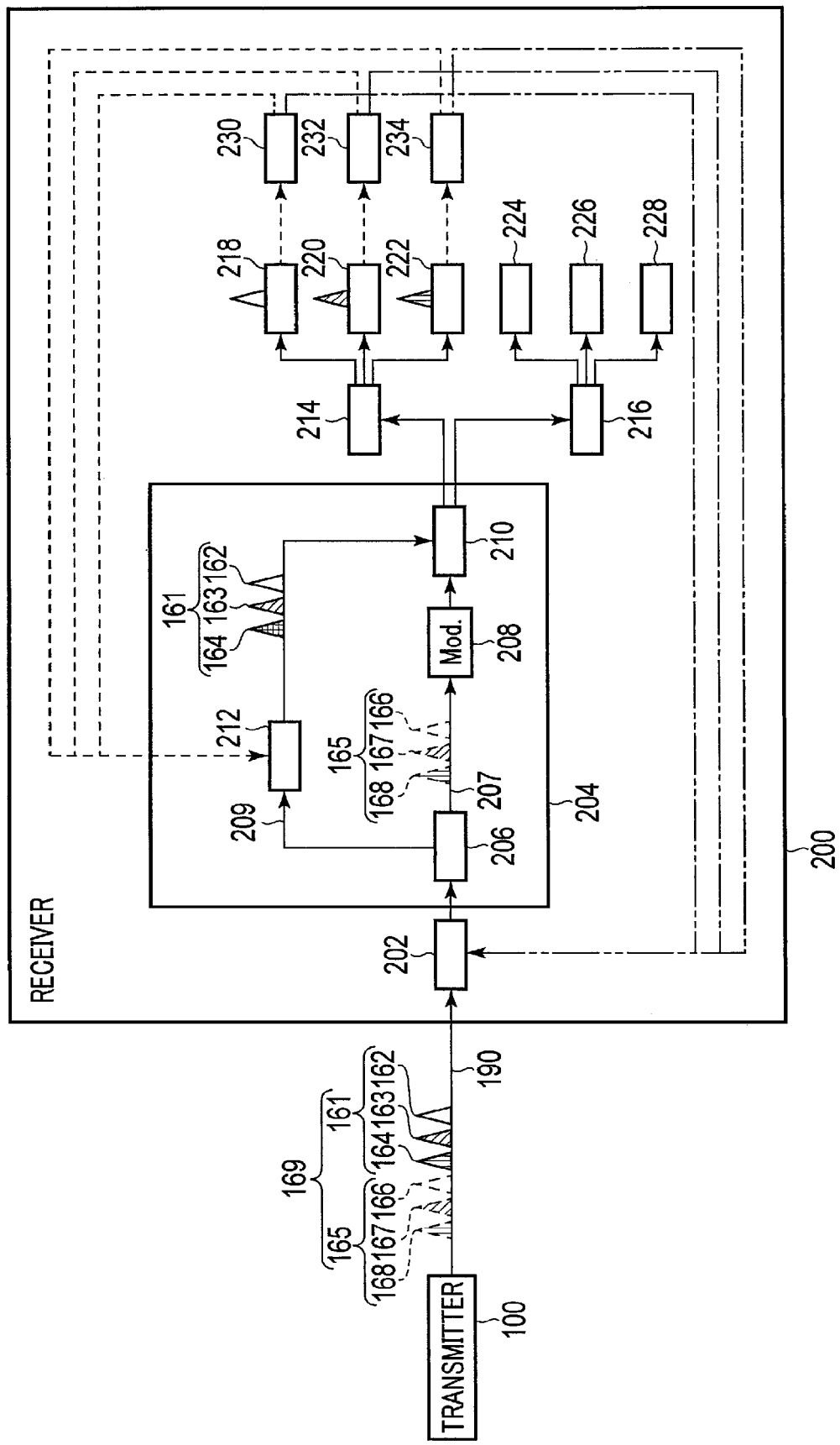
FIG. 2 is a diagram showing a receiver for the quantum key distribution system according to the first embodiment.

FIGS. 1 and 2 show a quantum key distribution system including a transmitter (transmitting apparatus) 100 and a receiver (receiving apparatus) 200 according to the first embodiment. Specifically, FIG. 1 schematically shows a configuration of the transmitter 100, and FIG. 2 schematically shows a configuration of the receiver 200.

As shown in FIG. 1, the transmitter 100 is connected to the receiver 200 by a transmission path 190. The transmission path 190 is an optical fiber, such as a single mode fiber. The transmitter 100 and the receiver 200 are synchronized with each other. For example, the quantum key distribution system includes a timing controller (not shown) which generates a synchronization signal for synchronizing the transmitter 100 and the receiver 200. For example, the timing controller is provided in the receiver 200, and a synchronization signal is transmitted to the transmitter 100 by a classical channel.

The transmitter 100 includes light sources 102, 104, and 106, a controller 108, attenuators 110, 112, and 114, a beam combiner 116, a beam splitter 118, a beam splitter 120, detectors 122, 124, and 126, controllers 128, 130, and 132, an interferometer 134, and an attenuator 142.

The light source 102 is connected to a first input port of the beam combiner 116 via the attenuator 110. The light source 104 is connected to a second input port of the beam combiner 116 via the attenuator 112. The light source 106 is connected to a third input port of the beam combiner 116 via the attenuator 114. The output port of the beam combiner 116 is connected to the input port of the beam splitter 118. A first output port of the beam splitter 118 is connected to the transmission path 190 via the interferometer 134 and the attenuator 142, and a second output port of the beam splitter 118 is connected to the input port of the beam splitter 120.

The interferometer 134 includes a beam splitter 136, a modulator 138, and a beam combiner 140. In the interferometer 134, the input port of the beam splitter 136 is connected to the first output port of the beam splitter 118. A first output port of the beam splitter 136 is connected to a first input port of the beam combiner 140 via the modulator 138, and a second output port of the beam splitter 136 is connected to a second input port of the beam combiner 140. From the light sources 102, 104, and 106 to the beam combiner 140, the optical fibers connecting components (for example, the light source 102 and the attenuator 110) may all be polarization-maintaining fibers. The output port of the beam combiner 140 is connected to the transmission path 190 via the attenuator 142.

A first output port of the beam splitter 120 is connected to the detector 122, a second output port of the beam splitter 120 is connected to the detector 124, and a third output port of the beam splitter 120 is connected to the detector 126. The optical fiber connecting the beam splitter 118 to the beam splitter 120 and the optical fibers connecting the beam splitter 120 to the detectors 122, 124, and 126 are, for example, a single mode fiber.

The light sources 102, 104, and 106 generate optical pulses 151, 152, and 153, respectively. In the present embodiment, the light sources 102, 104, and 106 generate the linearly-polarized optical pulses 151, 152, and 153. The light sources 102, 104, and 106 have different output wavelengths. In other words, the light sources 102, 104, and 106 generate the optical pulses 151, 152, and 153 having different wavelengths. For example, the wavelength of the optical pulse 152 is longer than that of the optical pulse 151 by 1 nm, and the wavelength of the optical pulse 153 is shorter than that of the optical pulse 151 by 1 nm. The light sources 102, 104, and 106 may be, but are not limited to, a laser diode.

The light sources 102, 104, and 106 are driven by a control signal applied by the controller 108. The control signal is, for example, a voltage signal having a predetermined frequency (for example, 1 GHz), which causes each of the light sources 102, 104, and 106 to generate an optical pulse at regular intervals (for example, at 1-nanosecond intervals).

The light sources 102, 104, and 106 output the optical pulses 151, 152, and 153 so that the polarization direction of each of the optical pulses 151, 152, and 153 is parallel to a specific axis (typically, the slow axis) of the polarization-maintaining fiber. The optical pulses 151, 152, and 153 emitted from the light sources 102, 104, and 106 are attenuated by the attenuators 110, 112, and 114, which serve as intensity adjusting devices, and enter the beam combiner 116. The beam combiner 116 combines the optical pulses 151, 152, and 153. The optical pulses 151, 152, and 153 enter the beam combiner 116 at different timings. The beam combiner 116 thereby outputs an optical pulse train 154 made of the optical pulses 151, 152, and 153 temporally separated. The beam combiner 116 is, but is not limited to, a wavelength combiner, such as a wavelength division multiplexer (WDM).

The controller 108 controls the light sources 102, 104, and 106 so that the optical pulses 151, 152, and 153 enter the beam combiner 116 at different timings. In the present embodiment, the optical paths from the light sources 102, 104, and 106 to the beam combiner 116 have the same length, and the output timings from the light sources 102, 104, and 106 are different from one another. The controller 108 causes the light sources 102, 104, and 106 to emit the optical pulses 151, 152, and 153 at different timings. For example, the optical pulse 152 is output $t_{laser}$ behind the optical pulse 151, and the optical pulse 153 is output $t_{laser}$ behind the optical pulse 152. $t_{laser}$ is shorter than the optical pulse output interval (for example, 1 nanosecond) of each light source. The controller 108 is also referred to as a light source controller.

It is possible to make the optical path length from the light source 104 to the beam combiner 116 longer than the optical path from the light source 102 to the beam combiner 116 by an optical path length corresponding to $t_{laser}$, make the optical path length from the light source 106 to the beam combiner 116 longer than the optical path length from the light source 104 to the beam combiner 116 by the optical path length corresponding to $t_{laser}$, and make the controller 108 cause the light sources 102, 104, and 106 to emit optical pulses at the same timing.

The beam splitter 118 splits the optical pulses 151, 152, and 153 output from the beam combiner 116 into two paths.

The optical pulse output from the first output port of the beam splitter 118 is used for generation of an encryption key, and will be called a signal pulse. The optical pulse output from the second output port of the beam splitter 118 is used for correction of the intensities of the optical pulses output from the light sources 102, 104, and 106, and will be called an intensity correction pulse. The optical pulse 151 is split by the beam splitter 118 into an intensity correction pulse 155 and a signal pulse 158. The optical pulse 152 is split by the beam splitter 118 into an intensity correction pulse 156 and a signal pulse 159. The optical pulse 153 is split by the beam splitter 118 into an intensity correction pulse 157 and a signal pulse 160.

The beam splitter 118 may be, but is not limited to, a fiber coupler. For example, another optical element may be used as the beam splitter 118. The branching ratio of the beam splitter 118 may be set so that the intensity of the intensity correction pulse is higher than the intensity of the signal pulse. The branching ratio may be 1:1 (i.e., the intensity of the intensity correction pulse may be set to be equal to the intensity of the signal pulse). The intensity of the intensity correction pulse may be set to be lower than the intensity of the signal pulse.

The beam splitter 120 splits the intensity correction pulses 155, 156, and 157 according to the wavelengths. The intensity correction pulses 155, 156, and 157 originate in the light sources 102, 104, and 106, respectively, and thus have different wavelengths. The intensity correction pulse 155 is directed to the detector 122, the intensity correction pulse 156 is directed to the detector 124, and the intensity correction pulse 157 is directed to the detector 126. The beam splitter 120 is, but is not limited to, a wavelength beam splitter, such as a WDM.

The detector 122 detects the intensity correction pulse 155, and outputs a detection result to the controller 128. The controller 128 controls the attenuator 110 based on the detection result received from the detector 122. The detector 124 detects the intensity correction pulse 156, and outputs a detection result to the controller 130. The controller 130 controls the attenuator 112 based on the detection result received from the detector 124. The detector 126 detects the intensity correction pulse 157, and outputs the detection result to the controller 132. The controller 132 controls the attenuator 114 based on the detection result received from the detector 126.

In the present embodiment, the detectors 122, 124, and 126 measure the intensities of incident light, and output detection signals indicative of the measured intensities to the respective controllers 128, 130, and 132. For example, when there is a disturbance in the intensity correction pulse 155, the intensity of the intensity correction pulse 155 measured at the detector 122 decreases. The controllers 128, 130, and 132 adjust the attenuators 110, 112, and 114 based on the detection signals so that the intensities of light incident on the detectors 122, 124, and 126 each have a target value. Accordingly, the optical pulses 151, 152, and 153 to be output from the light sources 102, 104, and 106 thereafter have the same intensity when entering the beam splitter 118. As a result, the signal pulses 158, 159, and 160 output from the beam splitter 118 have the same intensity. The controllers 128, 130, and 132 will be collectively referred to as an intensity controlling part. The attenuators 110, 112, and 114, the beam splitters 118 and 120, the detectors 122, 124, and 126, and the controllers 128, 130, and 132 will be collectively referred to as an intensity adjusting part.

The controllers 108, 128, 130, and 132 are realized by a dedicated hardware processor, such as a field programmable gate array (FPGA). The controllers 108, 128, 130, and 132 may be realized by a general purpose hardware processor, such as a central processing unit (CPU). Specifically, the functions of the controllers 108, 128, 130, and 132 may be realized by a general purpose hardware processor executing a computer program.

The interferometer 134 receives the signal pulses 158, 159, and 160 from the beam splitter 118. The interferometer 134 corresponds to an encoder that encodes information by using the signal pulses 158, 159, and 160. The information is information transmitted to the receiver 200 to generate an encryption key to be shared by the transmitter 100 and the receiver 200. In the present embodiment, the interferometer 134 is an asymmetric Mach-Zehnder interferometer.

The beam splitter 136 in the interferometer 134 splits the signal pulses 158, 159, and 160 into two paths 137 and 139. The beam splitter 136 splits the signal pulse 158 into signal pulses 162 and 166, splits the signal pulse 159 into signal pulses 163 and 167, and splits the signal pulse 160 into signal pulses 164 and 168. The signal pulses 162, 163, and 164 are directed to the path 137 as a signal pulse train (optical pulse train) 161, and the signal pulses 166, 167, and 168 are directed to the path 139 as a signal pulse train 165. The beam splitter 136 may be, but is not limited to, a fiber coupler.

The modulator 138 is provided on the path 137. The signal pulse train 161 which travels on the path 137 enters the modulator 138. The modulator 138 separately modulates the phases of the signal pulses 162, 163, and 164 to encode information. The modulator 138 applies respective phase shifts to the signal pulses 162, 163, and 164. For example, the modulator 138 applies a 0°-phase shift to the signal pulse 162, applies a 180°-phase shift to the signal pulse 163, and applies a 90°-phase shift to the signal pulse 164. The signal pulses 162, 163, and 164 modulated in phase by the modulator 138 enter the beam combiner 140.

As described above, the signal pulses 158, 159, and 160 are temporally separated. Therefore, the signal pulses 162, 163, and 164 are temporally separated, i.e., enter the modulator 138 at different timings. Accordingly, the transmitter 100 can separately modulate the signal pulses 162, 163, and 164 by the single modulator 138.

The signal pulse train 165 which travels on path 139 enters the beam combiner 140. The beam combiner 140 combines the signal pulse train 161 modulated in phase by the modulator 138 with the signal pulse train 165. The slow axis of the polarization-maintaining fiber connected to the second input port of the beam combiner 140 is rotated by 90° with respect to the slow axis of the polarization-maintaining fiber connected to the first input port of the beam combiner 140. The polarizations of the signal pulses 162, 163, and 164 are thereby made orthogonal to those of the signal pulses 166, 167, and 168. The beam combiner 140 may be, but is not limited to, a polarization beam splitter.

The optical path length of the path 139 from the beam splitter 136 to the beam combiner 140, which the signal pulse train 165 travels on, is longer than the optical length of the path 137 from the beam splitter 136 to the beam combiner 140, which the signal pulse train 161 travels on. The optical path length difference between the path 137 and the path 139 corresponds to the light propagation delay time $t_{delay}$. Namely, at the exit of the interferometer 134, the signal pulse train 165 is $t_{delay}$ behind the signal pulse train 161.

The signal pulse trains 161 and 165 output from the interferometer 134 enter the attenuator 142. The attenuator 142 attenuates the signal pulse trains 161 and 165 so that the intensities of the signal pulse trains 161 and 165 is at a single photon level. Specifically, the attenuator 142 attenuates the signal pulse trains 161 and 165 so that the mean number of photons per pulse of each of the signal pulses 162, 163, 164, 166, 167, and 168 is smaller than one. Where the mean number of photons per pulse of each signal pulse after attenuation is $\mu_1$, $\mu_1 < 1$. For example, $\mu_1 = 0.5$. The signal pulse trains 161 and 165 that have passed the attenuator 142 enter the transmission path 190, and are transmitted to the receiver 200 through the transmission path 190 as the signal pulse train 169. In this example, the output port of the attenuator 142 corresponds to a transmitting part that transmits the signal pulse train 169 to the receiver 200.

The attenuator 142 may be provided at another position, such as between the beam combiner 116 and the beam splitter 118 or between the beam splitter 118 and the interferometer 134. In this case, the output port of the beam combiner 140 corresponds to the transmitting part.

As shown in FIG. 2, the receiver 200 includes a polarization controller 202, an interferometer 204, beam splitters 214 and 216, detectors 218, 220, 222, 224, 226, and 228, and controllers 230, 232, and 234.

The input port of the polarization controller 202 is connected to the transmission path 190. The output port of the polarization controller 202 is connected to the interferometer 204. The interferometer 204 includes a beam splitter 206, a modulator 208, a beam combiner 210, and a delay line 212. In the interferometer 204, an input port of the beam splitter 206 is connected to the output port of the polarization controller 202. A first output port of the beam splitter 206 is connected to a first input port of the beam combiner 210 via the modulator 208. A second output port of the beam splitter 206 is connected to a second input port of the beam combiner 210 via the delay line 212. From the polarization controller 202 to the beam combiner 210, the optical fibers connecting components (for example, the beam splitter 206 and the modulator 208) may all be polarization-maintaining fibers. A first output port of the beam combiner 210 is connected to the detectors 218, 220, and 222 via the beam splitter 214, and a second output port of the beam combiner 210 is connected to the detectors 224, 226, and 228 via the beam splitter 216. The optical fiber connecting the beam combiner 210 to the beam splitter 214, the optical fibers connecting the beam splitter 214 to the detectors 218, 220, and 222, the optical fiber connecting the beam combiner 210 to the beam splitter 216, and the optical fibers connecting the beam splitter 216 to the detectors 224, 226, and 228 are, for example, a single mode fiber.

The receiver 200 receives the signal pulse train 169 transmitted by the transmitter 100. In the receiver 200, the signal pulse train 169 enters the polarization controller 202. In this example, the output port of the polarization controller 202 corresponds to a receiving part that receives the signal pulse train 169 from the transmitter 100. The signal pulse train 169 is made of a signal pulse train 161 and a signal pulse train 165, the signal pulse train 161 is made of the signal pulses 162, 163, and 164, and the signal pulse train 165 is made of the signal pulses 166, 167, and 168.

The polarization controller 202 controls the polarization state of incident light. The polarization controller 202 changes the polarization state of incident light to any polarization state, for example, by applying a stress to the optical fiber. The polarization controller 202 is controlled by the controllers 230, 232, and 234, and adjusts the polarization of the signal pulse train 169 for each wavelength. A method for adjusting the polarization of the signal pulse train 169 will be described later. The signal pulse train 169 that has passed the polarization controller 202 enters the interferometer 204.

The interferometer 204, the beam splitters 214 and 216, and the detectors 218, 220, 222, 224, 226, and 228 correspond to a decoder that receives the signal pulse train 169 from the polarization controller 202, and obtains (decodes) information transmitted by the transmitter 100, based on the signal pulse train 169. In the present embodiment, the interferometer 204 is an asymmetric Mach-Zehnder interferometer.

In the interferometer 204, the signal pulse train 169 enters the beam splitter 206. The beam splitter 206 splits the signal pulse train 161 and the signal pulse train 165 from one another, guides the signal pulse train 161 to a path 209, and guides the signal pulse train 165 to a path 207. The beam splitter 206 may be, but is not limited to, a polarization beam splitter.

The signal pulse train 165, which travels on the path 207, enters the modulator 208. The modulator 208 separately modulates the phases of the signal pulse train 165. The modulator 208 applies respective phase shifts to the signal pulses 166, 167, and 168. For example, the modulator 208 applies a 0°-phase shift to the signal pulse 166, applies a 90°-phase shift to the signal pulse 167, and applies a 0°-phase shift to the signal pulse 168. The signal pulse train 165 modulated in phase by the modulator 208 enters the beam combiner 210.

The signal pulses 166, 167, and 168 are temporally separated, i.e., enter the modulator 208 at different timings. Accordingly, the receiver 200 can separately modulate the signal pulses 166, 167, and 168 by the single modulator 208.

The signal pulse train 161 which travels on the path 209 enters the beam combiner 210. The beam combiner 210 combines the signal pulse train 165 modulated in phase by the modulator 208 with the signal pulse train 161. The beam combiner 210 may be, but is not limited to, a fiber coupler.

The optical path length of the path 209 from the beam splitter 206 to the beam combiner 210, which the signal pulse train 161 travels on, is longer than the optical length of the path 207 from the beam splitter 206 to the beam combiner 210, which the signal pulse train 165 travels on. The optical path length difference between the path 207 and the path 209 is designed to correspond to the light propagation delay time $t_{delay}$. Namely, the optical path difference of the interferometer 134 in the transmitter 100 is equal to that of the interferometer 204 in the receiver 200. Therefore, ideally, the signal pulse trains 161 and 165 simultaneously enter the beam combiner 210, and the signal pulse trains 161 and 165 interfere with each other at the beam combiner 210. Specifically, the signal pulses 162 and 166 simultaneously enter the beam combiner 210 and interfere with each other at the beam combiner 210, the signal pulses 163 and 167 simultaneously enter the beam combiner 210 and interfere with each other at the beam combiner 210, and the signal pulses 164 and 168 simultaneously enter the beam combiner 210 and interfere with each other at the beam combiner 210.

The delay line 212 is used to adjust the optical path length of the path 209. The delay line 212 is controlled by the controllers 230, 232, and 234, and adjusts the delay amounts of the signal pulses 162, 163, and 164 for the wavelengths. A method for adjusting the delay amounts of the signal pulses 162, 163, and 164 will be described later. The delay line 212 may be, but is not limited to, a fiber stretcher.

The light output from the beam combiner 210 passes through the beam splitter 214 or the beam splitter 216, and is detected at the detector 218, 220, 222, 224, 226, or 228. The beam splitter 214 splits light according to the wavelengths. The beam splitter 214 guides light having the output wavelength of the light source 102 to the detector 218, guides light having the output wavelength of the light source 104 to the detector 220, and guides light having the output wavelength of the light source 106 to the detector 222. Similarly, the beam splitter 216 splits light according to the wavelengths. The beam splitter 216 guides light having the output wavelength of the light source 102 to the detector 224, guides light having the output wavelength of the light source 104 to the detector 226, and guides light having the output wavelength of the light source 106 to the detector 228. The beam splitters 214 and 216 are, but are not limited to, a wavelength beam splitter, such as a WDM.

The photons generated by interference between the signal pulses 162 and 166 originating in the light source 102 are detected at the detector 218 or 224, the photons generated by interference between the signal pulses 163 and 167 originating in the light source 104 are detected at the detector 220 or 226, and the photons generated by interference between the signal pulses 163 and 167 originating in the light source 106 are detected at the detector 222 or 228. The detectors 218, 220, 222, 224, 226, and 228 are a single photon detector, such as an avalanche photodiode.

Due to non-ideal polarizations, the signal pulse trains 161 and 165 may not interfere with each other at the beam combiner 210. Therefore, it is desirable that the detectors 218, 220, 222, 224, 226, and 228 are gated so that signal pulses that did not interfere are not detected, i.e., so that the optical pulses that interfered can be selectively detected. The gated single photon detector is, for example, a self-difference avalanche photodiode, or a sinusoidal gate avalanche photodiode.

The controller 230 is connected to the detector 218, the controller 232 is connected to the detector 220, and the controller 234 is connected to the detector 222. The controllers 230, 232, and 234 may be connected to the detectors 224, 226, and 228, respectively. The controller 230 may be connected to both the detectors 218 and 224, the controller 232 may be connected to both the detectors 220 and 226, and the controller 234 may be connected to both the detectors 222 and 228.

The controllers 230, 232, and 234 control the polarization controller 202 and the delay line 212 based on detection results output from the detectors 218, 220, and 222. The polarization disturbance caused on the transmission path 190 and the phase disturbance caused by the optical path length disturbance in the fibers in the interferometer 134 or 204 vary depending on the wavelength. Therefore, control for each wavelength is required.

The polarization disturbance and phase disturbance need to be actively stabilized. In the present embodiment, the polarization disturbance is compensated for by actively controlling the polarization controller 202 based on the detection results of the detectors 218, 220, and 222, and the phase disturbance is compensated for by actively controlling the delay line 212 based on the detection results of the detectors 218, 220, and 222.

The polarization controller 202 adjusts the polarizations of the signal pulse train 169 for the wavelengths. Specifically, the polarization controller 202 rotates the polarizations of the signal pulses 162 and 166 in accordance with the rotation amount designated by the controller 230, rotates the polarizations of the signal pulses 163 and 167 in accordance with the rotation amount designated by the controller 232, and rotates the polarizations of the signal pulses 164 and 168 in accordance with the rotation amount designated by the controller 234. Consequently, the signal pulses 162, 163, and 164 have the same polarization, the signal pulses 166, 167, and 168 have the same polarization, and the polarization of the signal pulses 162, 163, and 164 is orthogonal to the polarization of the signal pulses 166, 167, and 168. As a result, the signal pulses 162, 163, and 164 are guided to the path 209, and the signal pulses 166, 167, and 168 are guided to the path 207.

The delay line 212 adjusts the delay amount of the signal pulse train 161 for each wavelength. Specifically, the delay line 212 applies an optical delay corresponding to the delay time designated by the controller 230 to the signal pulse 162, applies an optical delay corresponding to the delay time designated by the controller 232 to the signal pulse 163, and applies an optical delay corresponding to the delay time designated by the controller 234 to the signal pulse 164. As a result, the signal pulses 162 and 166 interfere with each other at the beam combiner 210, the signal pulses 163 and 167 interfere with each other at the beam combiner 210, and the signal pulses 164 and 168 interfere with each other at the beam combiner 210.

The controllers 230, 232, and 234 control the polarization controller 202 and the delay line 212 based on a feedback signal generated based on the detection results of the detectors 218, 220, and 222. The feedback signal is, for example, a quantum bit error rate (QBER). The quantum bit error rate is defined as a ratio of the number of error bits to the total number of bits included in the shift key. The quantum bit error rate is calculated after error correction. The polarization disturbance and phase disturbance increase the quantum bit error rate. The controllers 230, 232, and 234 each determine the rotation amount and delay time for a corresponding wavelength so that the quantum bit error rate is minimized. The polarization disturbance and phase disturbance can be appropriately corrected by such feedback control. The controllers 230, 232, and 234 will be collectively referred to as an optical pulse controlling part.

The controllers 230, 232, and 234 are realized by a dedicated hardware processor, such as a FPGA. The controllers 230, 232, and 234 may be realized by a general purpose hardware processor.

The delay line 212 may be provided on the path 207. Alternatively, the delay line 212 may be provided on the path 137 or 139 of the interferometer 134 in the transmitter 100. When the delay line 212 is provided in the interferometer 134 in the transmitter 100, the detection signals obtained at the detectors 218, 220, and 222 in the receiver 200 (or delay times determined based on the detection signals for the respective wavelengths) are transmitted to the transmitter 100 by the classical channel, and a control circuit in the transmitter 100 controls the delay line 212 based on the detection signals. The compensation for the phase disturbance may be achieved by adjusting the optical path length of the path by using the modulator 208 in the receiver 200 or the modulator 138 in the transmitter 100. In this case, the delay line 212 need not be provided.

The polarization controller 202 may be provided in the transmitter 100. For example, the polarization controller 202 may be provided in the stage subsequent to the beam combiner 140 or the attenuator 142. When the polarization controller 202 is provided in the transmitter 100, the detection signals obtained at the detectors 218, 220, and 222 in the receiver 200 (or rotation amounts determined based on the detection signals for the respective wavelengths) are transmitted to the transmitter 100 by the classical channel, and the control circuit in the transmitter 100 controls the polarization controller 202 based on the detection signals. The polarization controller 202 may be provided on the transmission path 190.

Next, an example of the method for generating an encryption key in the quantum key distribution system according to the present embodiment will be described.

The modulator 138 in the transmitter 100 randomly selects one of two encoding bases for each signal pulse of the signal pulse train 161, and modulates the phase of each signal pulse by using the selected encoding base. The first encoding base is defined so that information "0" corresponds to a 0°-phase shift, and information "1" corresponds to a 180°-phase shift. When the first encoding base is selected, the modulator 138 applies a 0°-phase shift to the signal pulse to encode information "0". The modulator 138 applies a 180°-phase shift to the signal pulse to encode information "1". The second encoding base is defined so that information "0" corresponds to a 90°-phase shift, and information "1" corresponds to a 270°-phase shift. When the second encoding base is selected, the modulator 138 applies a 90°-phase shift to the signal pulse to encode information "0". The modulator 138 applies a 270°-phase shift to the signal pulse to encode information "1".

In contrast, the modulator 208 in the receiver 200 randomly selects one of two decoding bases for each signal pulse of the signal pulse train 165, and modulates the phase of each signal pulse by using the selected decoding base. The first decoding base is defined as a 0°-phase shift. When the first decoding base is selected, the modulator 208 applies a 0°-phase shift to the signal pulse. The second decoding base is defined as a 90°-phase shift. When the second decoding base is selected, the modulator 208 applies a 90°-phase shift to the signal pulse.

When the polarizations of the signal pulse trains 161 and 165 are ideal, the signal pulse train 161 travels on route (1), below, and the signal pulse train 165 travels on route (2), below.

(1) Route along the path 137 of the interferometer 134 in the transmitter 100, which has a shorter optical path length, and the path 209 of the interferometer 204 in the receiver 200, which has a longer optical path length.

(2) Route along the path 139 of the interferometer 134 in the transmitter 100, which has a longer optical path length, and the path 207 of the interferometer 204 in the receiver 200, which has a shorter optical path length.

In this case, the signal pulse trains 161 and 165 interfere with each other at the beam combiner 210, and a photon is detected at one of the detectors 218, 220, 222, 224, 226, and 228. When a photon is detected at the detector 218, 220 or 222, the receiver 200 obtains information "0", and when a photon is detected at the detector 224, 226, or 228, the receiver 200 obtains information "1". The detector at which a photon is detected depends on the phase shift applied by the modulator 138 and the phase shift applied by the modulator 208. When the modulator 138 applies a 0°-phase shift, and the modulator 208 applies a 0°-phase shift, a photon is detected at the detector 218, 220, or 222. When the modulator 138 applies a 180°-phase shift, and the modulator 208 applies a 0°-phase shift, a photon is detected at the detector 224, 226, or 228. When the modulator 138 applies a 90°-phase shift, and the modulator 208 applies a 90°-phase shift, a photon is detected at the detector 218, 220, or 222. When the modulator 138 applies a 270°-phase shift, and the modulator 208 applies a 90°-phase shift, a photon is detected at the detector 224, 226, or 228. Those combinations apply when the same modulation bases are used in the transmitter 100 and the receiver 200.

When modulation is performed with combinations other than the above-described combinations, the probability of detection of photons at the detector 218, 220, or 222, or at the detector 224, 226, or 228 is 50%. For example, when the modulator 138 applies a 0°-phase shift, and the modulator 208 applies a 90°-phase shift, there is a 50% probability that a photon is detected at the detector 218, 220, or 222, and a 50% probability that a photon is detected at the detector 224, 226, or 228. In such a case, information cannot be correctly decoded; therefore, such a photon do not contribute to generation of an encryption key.

Due to non-ideal polarizations, the signal pulse train 161 which has traveled on the shorter path 137 may travel on the shorter path 207, and the signal pulse train 165 which has traveled on the longer path 139 may travel on the longer path 209. In such a case, the signal pulse trains 161 and 165 reach the detectors 218, 220, and 222 or the detectors 224, 226, and 228 without interfering. Those non-interfering photons do not contribute to generation of an encryption key; therefore, the detection results of those photons are discarded. When the detectors 218, 220, 222, 224, 226, and 228 are gated, the detectors 218, 220, 222, 224, 226, and 228 can automatically exclude those non-interfering photons. To effectively exclude the non-interfering photons, the delay time $t_{delay}$ is set to be half a gate operation cycle. For the gate operation of 1 GHz, the delay time $t_{delay}$ is 500 picoseconds.

The transmitter 100 periodically transmits a signal pulse train 169, whereby the receiver 200 obtains many interference detection results. Thereafter, a second classical communication device used together with the receiver 200 receives base information indicative of the encoding base selected for each optical pulse from a first classical communication device used together with the transmitter 100. The base information is transmitted and received by the classical channel. The controllers 230, 232, and 234 of the receiver 200 combine information obtained when selecting a decoding base that matches the encoding base selected by the transmitter 100, and thereby generate a bit string (shift key). Similarly, base information is transmitted from the first classical communication device to the second classical communication device, and a shift key is generated at the transmitter 100. After that, error correction and privacy amplification are performed, and an encryption key shared by the transmitter 100 and the receiver 200 is generated.

As described above, the transmitter 100 modulates signal pulses having different wavelengths by one modulator 138, and the receiver 200 modulates signal pulses having different wavelengths by one modulator 208. This enables avoidance of complication of the apparatus and reduction of the apparatus cost, in comparison with the case where modulators equal in number to wavelengths are provided in each of the transmitter and the receiver.

Moreover, the receiver 200 adjusts the polarizations of signal pulses having different wavelengths by one polarization controller 202, and adjusts the delay amounts of signal pulses having different wavelengths by one polarization controller 202. This enables avoidance of complication of the apparatus.

Second Embodiment

Figure 3:
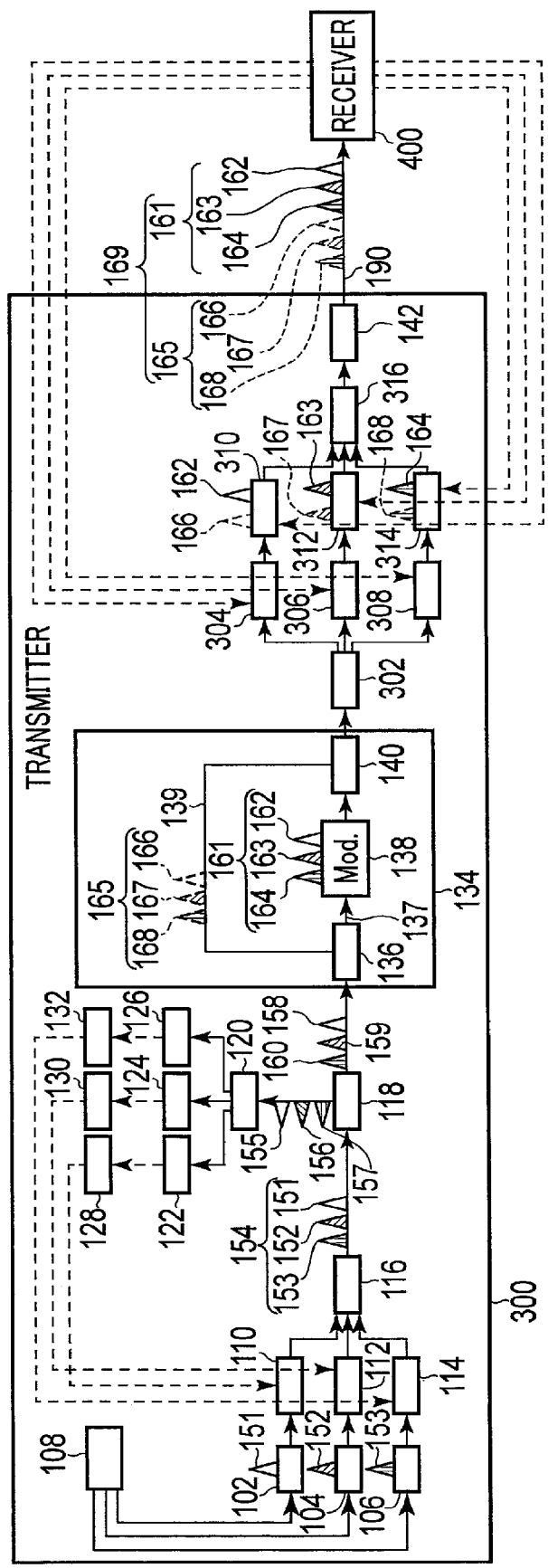
FIG. 3 is a diagram showing a transmitter for a quantum key distribution system according to a second embodiment.
Figure 4:
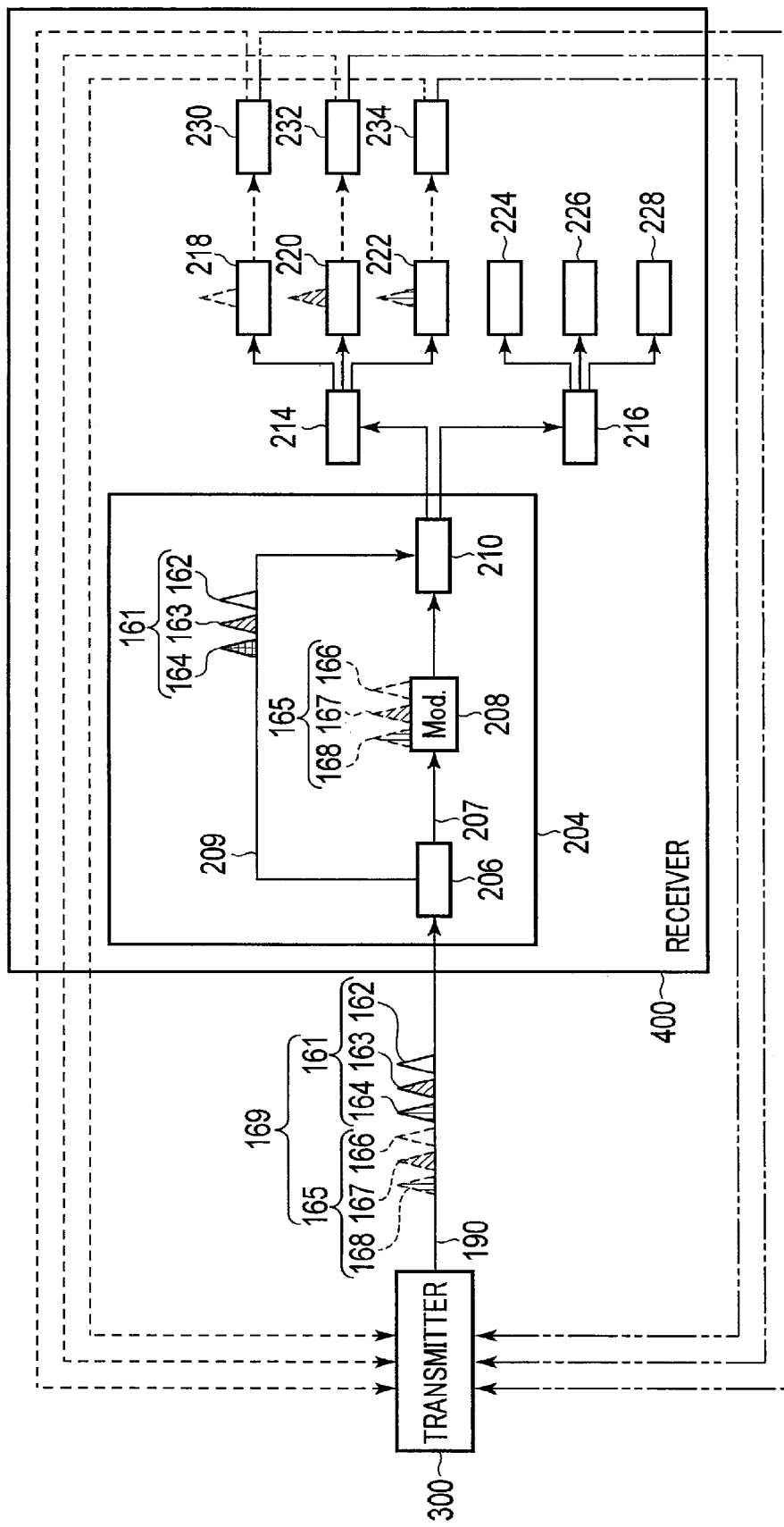
FIG. 4 is a diagram showing a receiver for the quantum key distribution system according to the second embodiment.

FIGS. 3 and 4 show a quantum key distribution system including a transmitter (transmitting apparatus) 300 and a receiver (receiving apparatus) 400 according to the second embodiment. Specifically, FIG. 3 schematically shows a configuration of the transmitter 300, and FIG. 4 schematically shows a configuration of the receiver 400. In FIGS. 3 and 4, the same elements as those shown in FIGS. 1 and 2 are assigned with the same reference numerals as those in FIGS. 1 and 2, and descriptions of those elements will be omitted.

As shown in FIG. 3, the transmitter 300 includes light sources 102, 104, and 106, a controller 108, attenuators 110, 112, and 114, a beam combiner 116, a beam splitter 118, a beam splitter 120, detectors 122, 124, and 126, controllers 128, 130, and 132, an interferometer 134, an attenuator 142, a beam splitter 302, delay lines 304, 306, and 308, polarization controllers 310, 312, and 314, and a beam combiner 316. The transmitter 300 differs from the transmitter 100 (FIG. 1) in that the beam splitter 302, the delay lines 304, 306, and 308, the polarization controllers 310, 312, and 314, and the beam combiner 316 are provided between the beam combiner 140 in the interferometer 134 and the attenuator 142.

As shown in FIG. 4, the receiver 400 includes an interferometer 204, beam splitters 214 and 216, detectors 218, 220, 222, 224, 226, and 228, and controllers 230, 232, and 234. The interferometer 204 includes a beam splitter 206, a modulator 208, and a beam combiner 210. The receiver 400 differs from the receiver 200 (FIG. 2) in that the polarization controller 202 and the delay line 212 are omitted.

The input port of the beam splitter 302 is connected to the output port of the beam combiner 140. A first output port the of the beam splitter 302 is connected to a first input port of the beam combiner 316 via the delay line 304 and the polarization controller 310, a second output port of the beam splitter 302 is connected to a second input port of the beam combiner 316 via the delay line 306 and the polarization controller 312, and a third output port of the beam splitter 302 is connected to a third input port of the beam combiner 316 via the delay line 308 and the polarization controller 314. An output port of the beam combiner 316 is connected to the transmission path 190 via the attenuator 142.

The beam splitter 302 splits optical pulses according to the wavelengths. The beam splitter 302 separates an optical pulse having the same wavelength as the output wavelength of the light source 102 (specifically, signal pulses 162 and 166), an optical pulse having the same wavelength as the output wavelength of the light source 104 (specifically, signal pulses 163 and 167), and an optical pulse having the same wavelength as the output wavelength of the light source 106 (specifically, signal pulses 164 and 168) from one another. The beam splitter 302 is, but is not limited to, a wavelength beam splitter, such as a WDM.

The signal pulses 162 and 166 output from the interferometer 134 enter the beam splitter 302, and are output from the first output port of the beam splitter 302. The delay line 304 adjusts the optical path length of the path that the signal pulses 162 and 166 travel on, and the polarization controller 310 controls the polarizations of the signal pulses 162 and 166. The delay line 304 and the polarization controller 310 are controlled by the controller 230 in the receiver 400. The delay line 304 applies an optical delay corresponding to the delay time designated by the controller 230 to the signal pulse 162 or 166, and the polarization controller 310 rotates the polarizations of the signal pulses 162 and 166 in accordance with the rotation amount designated by the controller 230.

The signal pulses 163 and 167 output from the interferometer 134 enter the beam splitter 302, and are output from the second output port of the beam splitter 302. The delay line 306 adjusts the optical path length of the path that the signal pulses 163 and 167 travel on, and the polarization controller 312 controls the polarizations of the signal pulses 163 and 167. The delay line 306 and the polarization controller 312 are controlled by the controller 232 in the receiver 400. The delay line 306 applies an optical delay corresponding to the delay time designated by the controller 232 to the signal pulse 163 or 167, and the polarization controller 312 rotates the polarizations of the signal pulses 163 and 167 in accordance with the rotation amount designated by the controller 232.

The signal pulses 164 and 168 output from the interferometer 134 enter the beam splitter 302, and are output from the third output port of the beam splitter 302. The delay line 308 adjusts the optical path length of the path that the signal pulses 164 and 168 travel on, and the polarization controller 314 controls the polarizations of the signal pulses 164 and 168. The delay line 308 and the polarization controller 314 are controlled by the controller 234 in the receiver 400. The delay line 308 applies an optical delay corresponding to the delay time designated by the controller 234 to the signal pulse 164 or 168, and the polarization controller 314 rotates the polarizations of the signal pulses 164 and 168 in accordance with the rotation amount designated by the controller 234.

In the second embodiment, the delay lines 304, 306, and 308 and the polarization controllers 310, 312, and 314 are provided in correspondence with respective wavelengths. The delay lines 304, 306, and 308 adjust the delay amounts of signal pulses having respective wavelengths so that the signal pulses 162 and 166 interfere with each other in the beam combiner 210 in the receiver 400, the signal pulses 163 and 167 interfere with each other in the beam combiner 210, and the signal pulses 164 and 168 interfere with each other in the beam combiner 210. The polarization controllers 310, 312, and 314 adjust the polarizations of signal pulses having respective wavelengths so that the signal pulses 162, 163, 164, 166, 167, and 168 are properly split by the beam splitter 206 in the receiver 400.

The optical system from the beam splitter 302 to the beam combiner 316 may be in the stage preceding the interferometer 134. The optical system from the beam splitter 302 to the beam combiner 316 may be on the transmission path 190.

In the second embodiment, one modulator 138 is provided in the transmitter 300 and one modulator 208 is provided in the receiver 400 for three light sources 102, 104, and 106 having different output wavelengths, as in the first embodiment. This enables reduction in the apparatus cost.

In the second embodiment, the polarization controllers 310, 312, and 314 are provided in correspondence with respective wavelengths. Accordingly, polarization controllers that operate at a lower speed than the polarization controller 202 shown in FIG. 2 can be utilized as the polarization controllers 310, 312, and 314.

In the above-described embodiments, three light sources having different output wavelengths are provided. In other embodiments, two or more than four light sources having different output wavelengths may be provided. In the embodiments in which many light sources having different output wavelengths are provided, two or more modulators may be used in each of the transmitter and the receiver. For example, when six light sources are provided, the transmitter and the receiver may each include two modulators, i.e., a modulator that modulates optical pulses originating in three light sources, and a modulator that modulates optical pulses originating in the remaining three light sources. Even in this case, the number of modulators is smaller than the number of wavelengths (number of light sources), complication of the quantum key distribution system can be avoided, and the cost can be reduced.

In the above-described embodiments, the quantum key distribution scheme based on a quantum key distribution method called BB84 are described. The methods for modulating optical pulses according to the above described embodiments may be applied to another quantum key distribution scheme, such as a differential phase shift quantum key distribution (DPS-QKD). In the differential phase shift quantum key distribution, the encoder is a phase modulator that modulates the phase of a signal pulse based on information to be transmitted, and the decoder does not include a phase modulator in the interferometer.

The methods for modulating optical pulses according to the above-described embodiments can be applied not only to the quantum key distribution system, but also to a quantum communication system utilizing modulation and wavelength multiplexing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum communication system comprising:
   a transmitting apparatus; and
   a receiving apparatus, wherein
   the transmitting apparatus comprises:
   a plurality of light sources configured to generate a plurality of optical pulses having different wavelengths;
   an encoder including:
     a first beam splitter configured to split the optical pulses into a first path and a second path having a different optical path length from the first path;
     a single first modulator provided on the first path, the single first modulator being configured to modulate the optical pulses that travel on the first path to encode information; and
     a first beam combiner configured to combine a first optical pulse train including the modulated optical pulses and a second optical pulse train including optical pulses that travel on the second path; and
   a transmitting part configured to transmit the first optical pulse train and the second optical pulse train to the receiving apparatus, and
   the receiving apparatus comprises:
   a receiving part configured to receive the first optical pulse train and the second optical pulse train from the transmitting apparatus; and
   a decoder configured to obtain information based on the received first optical pulse train and the received second pulse train, the decoder including:
     an interferometer including: a second beam splitter configured to split the first optical pulse train and the second optical pulse train from each other, guide the second optical pulse train to a third path, and guide the first optical pulse train to a fourth path having a different optical path length from the third path; a single second modulator provided on the third path and configured to modulate the second optical pulse train traveling on the third path; and a second beam combiner configured to combine the second optical pulse train modulated by the second modulator and the first optical pulse train traveling on the fourth path; and a plurality of detectors provided in correspondence with the respective wavelengths and configured to detect a photon output from the interferometer.

2. The quantum communication system according to claim 1, wherein the transmitting apparatus further comprises a light source controller configured to control the light sources, and the optical pulses enter the first modulator at different timings.

3. The quantum communication system according to claim 2, wherein the light source controller causes the light sources to emit the optical pulses at different timings.

4. The quantum communication system according to claim 1, wherein
the transmitting apparatus further comprises:
a plurality of intensity adjusting devices provided in correspondence with the respective wavelengths and configured to adjust intensities of the optical pulses; and
an intensity controller configured to control the intensity adjusting devices, the intensities of the optical pulses adjusted by the intensity adjusting devices being equal to one another.

5. The quantum communication system according to claim 1, further comprising:
a polarization controller configured to control polarizations of the optical pulse train for the wavelengths; and
an optical pulse controlling part configured to control the polarization controller based on detection results of the detectors.

6. The quantum communication system according to claim 1, further comprising:
a plurality of polarization controllers provided in correspondence with the respective wavelengths, and each configured to control a polarization of an optical pulse having a corresponding wavelength of the optical pulse train; and
an optical pulse controlling part configured to control the polarization controllers based on detection results of the detectors.

7. The quantum communication system according to claim 6, further comprising:
a plurality of delay lines provided in correspondence with the respective wavelengths, and each configured to control a delay amount of an optical pulse having a corresponding wavelength of the optical pulse train, wherein
the optical pulse controlling part further controls the delay lines based on the detection results of the detectors.

8. A receiving apparatus for a quantum communication system, the receiving apparatus comprising:
a receiving part configured to receive a first optical pulse train and a second optical pulse train, the first optical pulse train and the second optical pulse train each including a plurality of optical pulses having different wavelengths and temporally separated;
an interferometer including: a beam splitter configured to split the first optical pulse train and the second optical pulse train from each other, guide the first optical pulse train to a first path, and guide the second optical pulse train to a second path having a different optical path length from the first path; a single modulator provided on the first path and configured to modulate the first optical pulse train traveling on the first path; and a beam combiner configured to combine the modulated first optical pulse train and the second optical pulse train traveling on the second path; and
a plurality of detectors provided in correspondence with the respective wavelengths and configured to detect a photon output from the interferometer.

* * * * *